(12) United States Patent
Hanna et al.

(10) Patent No.: US 6,997,400 B1
(45) Date of Patent: Feb. 14, 2006

(54) APPARATUS AND METHOD FOR REDUCING ANHYDROUS AMMONIA APPLICATION BY OPTIMIZING DISTRIBUTION

(75) Inventors: H. Mark Hanna, Urbandale, IA (US); Paul M. Boyd, Glenwood, IA (US)

(73) Assignee: Iowa State University Research Foundation, Inc., Ames, IA (US)

( * ) Notice: Subject to any disclaimer, the term of this patent is extended or adjusted under 35 U.S.C. 154(b) by 56 days.

(21) Appl. No.: 10/620,925

(22) Filed: Jul. 16, 2003

Related U.S. Application Data

(60) Provisional application No. 60/396,763, filed on Jul. 17, 2002.

(51) Int. Cl.
*B05B 1/34* (2006.01)
*B05B 3/04* (2006.01)
*B05B 3/16* (2006.01)
*A01C 23/00* (2006.01)
*A62C 2/08* (2006.01)

(52) U.S. Cl. ............... 239/383; 239/381; 239/548; 111/119

(58) Field of Classification Search ............ 239/383, 239/381, 548, 142, 159, 172, 380, 382, 389, 239/214.15, 662; 137/561 A; 111/119
See application file for complete search history.

(56) References Cited

U.S. PATENT DOCUMENTS

| | | | | |
|---|---|---|---|---|
| 2,973,728 A | * | 3/1961 | Garretson | 111/119 |
| 4,807,663 A | * | 2/1989 | Jones | 137/561 A |
| 5,170,820 A | * | 12/1992 | Jones | 137/899 |
| 5,271,567 A | * | 12/1993 | Bauer | 239/662 |
| 5,372,160 A | * | 12/1994 | Ward | 137/561 A |
| 6,003,534 A | * | 12/1999 | Gould et al. | 137/1 |
| 6,202,942 B1 | * | 3/2001 | Hultgreen et al. | 239/214.15 |

OTHER PUBLICATIONS

CDS-John Blue Company Introduces The "Exacto-Flow" FD-1200 and FD-2000 Flow Dividers, Brochure, Undated (2 pages).
H. I. Fraser PTY LTD., The Trangie Rotaflow, Anhydrous ammonia distribution technology, Brochure, Undated (4 pages).
"The Trangie Rotaflow ®" and Anhydrous Ammonia Distribution Technology, Brochure, Undated, (2 pages).
Fraser "Rotaflow Anhydrous Distribution Technology—Performance Under Pressure", Brochure (6 pages).

(Continued)

*Primary Examiner*—David A. Scherbel
*Assistant Examiner*—Darren Gorman
(74) *Attorney, Agent, or Firm*—McKee, Voorhees & Sease, P.L.C.

(57) ABSTRACT

An apparatus, method, and system for distributing gas and/or liquid phase substance from an inlet to multiple outlets with reduced variations and distribution. The apparatus includes a body having an inlet and a plurality of outlets. In one aspect, a rotatable impeller is positioned between inlet and plurality of outlets. The impeller includes a spiral fluid pathway relative to direction of substance through the inlet so that the substance passes through the impeller and is distributed to the outlets through a spinning impeller.

60 Claims, 12 Drawing Sheets

OTHER PUBLICATIONS

Steel, R.G., J. H. Torrie, and D.A. Dickey, Principles and Procedures of Statistics: A Biometrical Approach. 3$^{rd}$ edition. McGraw Hills Companies, Inc. New York. 1997 pp. 26-27 (on one sheet).

American Society of Agricultural Engineers, Calibration and Distribution Pattern Testing of Agricultural Aerial Application Equipment, ASAE S3862.2 Dec. 98, (cover sheet plus pp. 237-240).

American Society of Agricultural Engineers, Procedure for Measuring Distribution Uniformity and Calibrating Granular Broadcast Spreaders, ASAE S341.3 Feb. 99, (cover pages plus pp. 190-193).

* cited by examiner

APPARATUS AND METHOD FOR REDUCING ANHYDROUS AMMONIA APPLICATION BY OPTIMIZING DISTRIBUTION

I. CROSS-REFERENCE TO RELATED APPLICATIONS

This application claims benefit under 35 U.S.C. § 119(e) of provisional application 60/396,763 filed Jul. 17, 2002.

II. BACKGROUND OF THE INVENTION

Application or injection of chemicals, such as fertilizers, on or into the soil, is commonly used to enhance growth and yield for agricultural plants. In come cases, such substances are in fluid-form (liquid or gaseous phase, as opposed to solid phase). Apparatus is required to convey the substance from a bulk storage container to the ground.

One example is the injection of anhydrous ammonia ($NH_3$) (a gas at ambient temperatures and pressures) into the ground. Normally, the substance is kept under pressure in liquid phase in a large bulk holding container or tank. What are called knives have discharge ends that are dragged through the ground. A valving and distribution system can be selectively operated to convey anhydrous ammonia from the tank to the knives as the knives are dragged through the ground to emplace the fertilizer in the ground. Nitrogen fertilizer is a major input in terms of cost and energy in production of major crops (e.g. corn, wheat, cotton, rice). Anhydrous ammonia is the most popular form of nitrogen fertilizer application.

Physical properties of anhydrous ammonia can cause it to convert from a high pressure liquid to a mixture of liquid and gas as it travels through application equipment. The mixture is very difficult to evenly distribute to individual application knives across the swath width of the applicator. These distribution problems may be the cause of over-application. Because liquid ammonia is much more dense than gaseous form, openings that receive greater proportions of liquid ammonia will distribute more nitrogen to their knives than openings that receive greater proportions of gaseous ammonia. This results in often highly variable application across the applicator swath.

Normally some type of manifold is used to distribute anhydrous ammonia from the tank to a plurality of knives, so that in one pass, a plurality of rows can be fertilized. During the past 10 years, new low pressure anhydrous ammonia manifolds have been developed. Each manifold has some potential to improve upon the widely varying distribution of the 40-year-old "conventional" radial outlet manifold.

The present inventors conducted studies of several types of commercially available distribution manifolds. Eight manifolds were evaluated during field application at application rates of 84 kg N/ha (75 lb N/ac) and 168 kg N/ha (150 lb N/ac). The actual ammonia stream from each outlet of the manifold was collected and weighed after each run to determine mean, % difference from mean, highest outlet to lowest outlet weight ratio, and the coefficient of variation ("CV") for each run with 11 knife outlets. Results showed that the use of the older "conventional" manifold can result in coefficient of variation or CV values in excess of 30%. Some studies indicate as much as a four-to-one shank-to-shank output variation across an applicator. In general, all the newer manifold designs tested reduced this value, some achieving CV values in the 5% range. But some still have on the order of two-to-one variation between shanks. During application the operator cannot tell if there is over- or under-application. The term CV or coefficient of variation, as used herein, is in percentage as a statistical indicator of variation in output of each manifold. The lower, the better. The coefficient of variation is a well-known indicator. (See, e.g., Steel, R. G., J. H. Torrie, and D. A. Dickey. *Principles and Procedures of Statistics: A Biometrical Approach.* $3^{rd}$ ed. McGraw-Hill Companies, Inc. New York. 1997 Pg. 26–27; and ASAE (American Society of Agricultural Engineers) S386.2 DEC98 *Calibration and Distribution Pattern Testing of Agricultural Aerial Application Equipment*, ASAE—The Society for engineering and agricultural, food, and biological systems, 2950 Niles Rd., St. Joseph, Mich. 49085-9659; and ASAE (American Society of Agricultural Engineers) S341.3 FEB99 *Procedure for Measuring Distribution Uniformity and Calibrating Granular Broadcast Spreaders*, ASAE—The Society for engineering and agricultural, food, and biological systems, 2950 Niles Rd., St. Joseph, Mich. 49085-9659).

The above-mentioned testing of existing distribution manifolds show there is room for improvement in distribution from the holding container to the application knives. Even a reduction of a few percent of anhydrous ammonia use by improved application equipment and methods could materially decrease the amount of nitrogen release (including into surface and ground water resources) as well as cost to the producers. Some of the existing distribution systems tested (on a three-point DMI model 3250 anhydrous ammonia applicator) include:

Rotaflow™ from H. I. Fraser Pty LTD (Sydney, Australia) —top feed rotary with flow of material though impeller, not outside it.

Equaflow™ from PGI Intl.—Rotary outlets with internal cavity size manually controlled by user.

Vertical Dam designs (small and large, cotton or corn rings) from Continental $NH_3$ Products—ammonia enters from side and swirls into radial outlets.

Conventional manifolds (Model 3497) from Continental $NH_3$ Products (one with mixer; one with nipple; one with street elbow). Also, a COLD-FLO® System 16 (#20340 canister and separate 16 outlet distribution manifolds.) Also, side entry linear and tee entry linear manifold designs and a FD-1200 (CDS John Blue Co.) were tested.

There is a need for optimization of distribution. Development of such a manifold is vital to the future use of this fertilizer form in precision agriculture applications including variable rate application and late spring side dressing of ammonia. Existing manifold designs exhibit noticeable variation as they distribute anhydrous ammonia fertilizer to each of the injection knives on the toolbar applicator. This can lead in the field to nitrogen deficiencies, adversely affecting yield or excesses, adversely affecting environmental quality.

Four measures of variability among outlet distribution were computed. Average outlet difference is the average absolute difference in kg(lb)$NH_3$ of all outlets from the mean output of all outlets for a particular test plot. The average percentage outlet difference is the average of absolute outlet difference from the mean outlet output expresses a percentage of a mean outlet output. This percentage measures use to indicate the average percentage each outlet is from the mean application rate and to normalize variability based on the ammonia collected during each plot run. High/low ratio is the ratio of the ammonia weight from the outlet with the greatest output to the outlet with the least output for a specific application. Coefficient of variation (CV) among the outlets was also included.

Variability among entry methods for the conventional manifolds was different for the lower application rate but at the higher rate, all conventional manifolds had equal variability. The COILD-FLO® manifold had greater variability than all other manifolds tested. The lowest variability across the outlets was measured with the Rotaflow™ and small-housing vertical-dam manifolds at both application rates. Although the small-housing vertical-dam had low variability, it also had a lower flow rate through the manifold and subsequent lower application rate for the same regulator setting. A general trend of decreasing variability with increasing manifold pressure was seen.

Further discussion of problems with present distribution manifolds is set forth at "Rate Variability of Anhydrous Ammonia Applicator Equipment", ISU Extension publication PM-1747, and "Improving the Uniformity of Anhydrous Ammonia Application", Iowa State University, University Extension publication PM 1875 (June 2001), both incorporated by reference herein.

Vertical dam manifolds and the COLD-FLO® system try to solve the gas/liquid mixture problem by separating gas and liquid phases and metering equal portions of each to each knife.

III. BRIEF SUMMARY OF THE INVENTION

The present invention relates to a distribution manifold for distributing a gas and liquid phase substance from a single inlet to multiple outlets with reduced distribution variation. In one aspect of the invention, an apparatus comprises a body, an inlet, a plurality of outlets, a fluid pathway between inlet and outlets, and mechanism to move the exit of the pathway in a controlled manner past the outlets. In one aspect, the mechanism is an impeller, being rotatable and having a surface at an angle to flow of the substance (e.g. external flighting or a spiral groove), allows the substance to pass from the inlet and at the surface as the impeller rotates, to then distribute the substance to the outlets. Impeller rotation can be induced by pressure of the incoming substance against the impeller surface(s). The fluid pathway can be multiple pathways. Optionally, rotation can be powered by a motor or other actuator.

The method according to the invention includes placing, in the delivery path of the substance, a member that moves the substance pathway, by the outlets at a controlled rate. In one aspect, the member rotates in the path of the substance prior to the substance reaching a plurality of distribution outlets. Some embodiments of the pathway can include an external pathway on a rotating member and/or one or more spiral grooves.

Improved accuracy in distribution manifolds can result in lower ammonia application rates resulting in less nitrate leaching and reduced yield variability. Recommendations can also be made to achieve the most even fertilizer distribution at different application rates.

IV. BRIEF DESCRIPTION OF THE DRAWINGS

FIGS. 1A–C illustrate in perspective, exploded, and sectional views respectively, an apparatus according to one aspect of the invention.

FIGS. 2A–G illustrate in various views the main body of the apparatus of FIGS. 1A–C. FIGS. 2C–2E are generally to scale.

FIGS. 3A–F illustrate in various views an impeller which is positionable inside the body of FIGS. 2A–G for the apparatus of FIGS. 1A–C. FIGS. 3C–3F are generally to scale.

FIGS. 4A–H illustrate various views of a bearing assembly used with the impeller of FIGS. 3A–F relative to the body of FIGS. 2A–G for the apparatus of FIGS. 1A–C. FIGS. 4B–4H are generally to scale.

FIG. 5 is an isolated perspective view of a cover for the body of FIGS. 2A–G of the apparatus of FIGS. 1A–C, and which supports the bearing assembly of FIGS. 4A–H.

FIGS. 6A–C show in more detail the cover member of FIG. 5 in isolation. FIGS. 6A–6C are generally to scale.

V. DETAILED DESCRIPTION OF THE PREFERRED EMBODIMENT

Figure 1A:
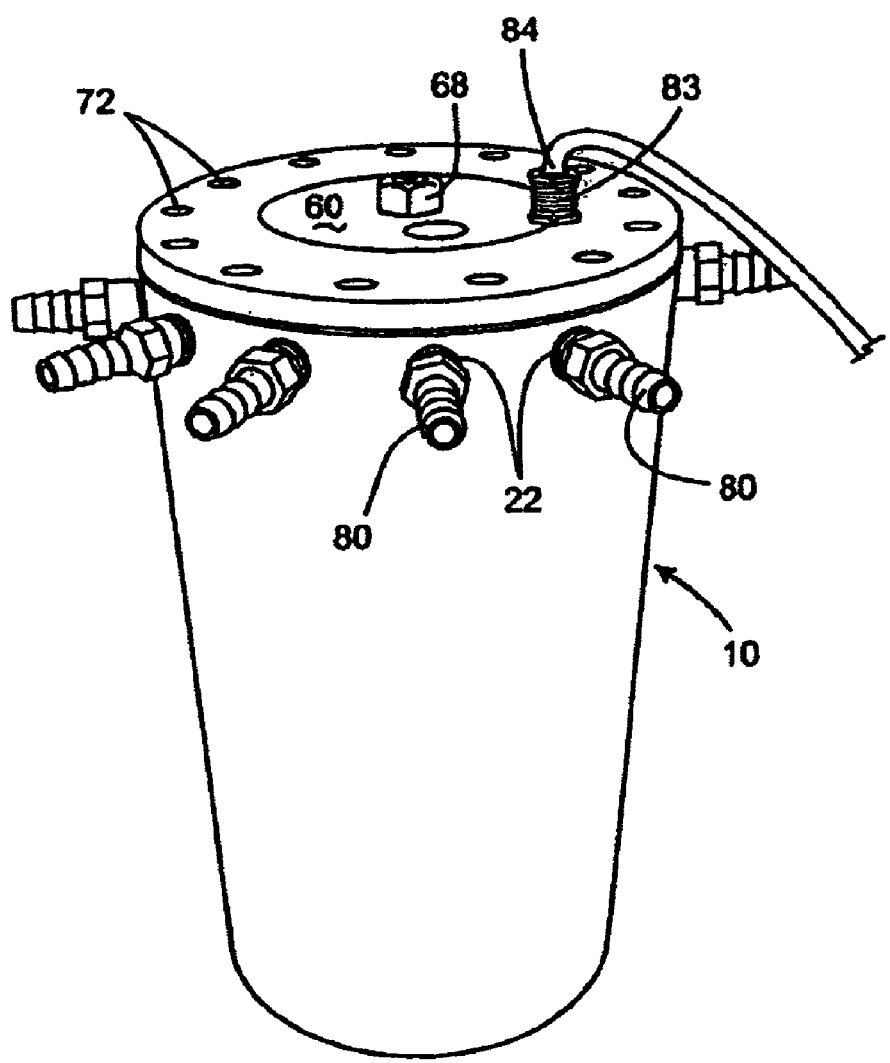

For a better understanding of the invention, one exemplary embodiment will now be described in detail. It is to be understood that this is but one form the invention can take and does not limit the scope of the invention. Variations obvious to those skilled in the art will be included within the invention.

A. General Environment of Use of the Invention

An embodiment of the invention is here referred to as distribution manifold 10. Manifold 10 includes an input adapted to be connected to a pressurized source of anhydrous ammonia (see FIG. 1B), and has a plurality of fittings 80 radially distributed around the manifold body 12 (see FIG. 1A) that can be operatively connected to hoses 71 which, in turn, are connected at distal ends to individual injection knives for an anhydrous ammonia injection system (see FIG. 1B where, for simplicity, just one fitting 80 from an outlet 22 is diagrammatically illustrated connected by a hose 71 to an injection knife).

Distribution manifold 10 can be used for anhydrous ammonia fertilizer for agriculture. It uses an impeller 30 that spins with the movement of the ammonia past it; the pressurized fluid creates a force against the angled flighting or groove of the impeller, causing the impeller to spin. The impeller 30 slings the ammonia radially outward to a set of outlets evenly spaced around the manifold. The movement of the impeller more evenly distributes the ammonia to the outlets 22 than existing designs. Most of the existing manifolds have radial outlets, but without an impeller to distribute the ammonia. The more even the distribution of ammonia to the manifold outlets, the more even the distribution of fertilizer across the field. With uneven distribution, producers are in the habit of over-applying to ensure a minimum application rate. The use of this design could reduce the application of ammonia while still meeting yield goals.

Manifold 10 could be installed on cooperative-owned toolbars and rented to member producers. A few producers own their own anhydrous ammonia toolbars, but the majority are rented or a custom applicator is hired to do the application. Two main purchasers would be cooperative and custom applicators.

B. Specific Apparatus Structural Components

Figure 1B:
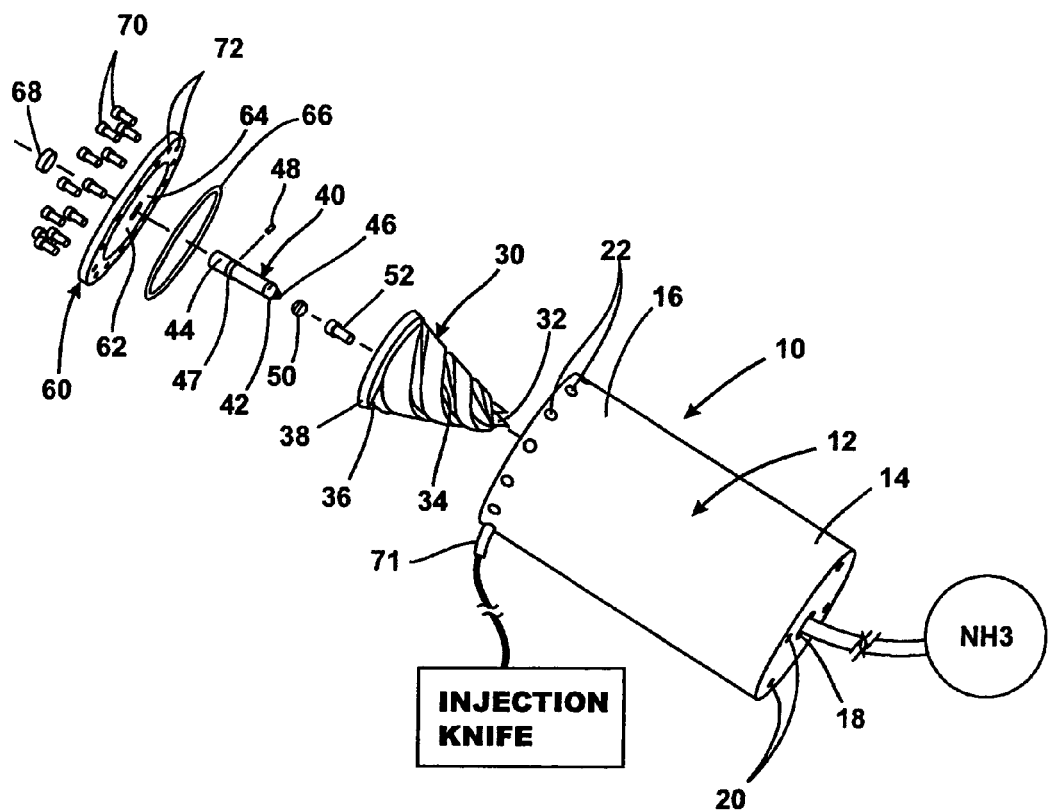
Figure 1C:
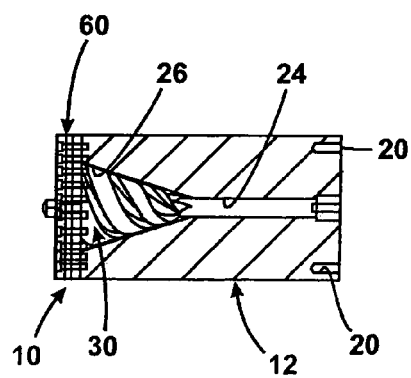

More specifics of distribution manifold 10 can be seen in the drawings. FIGS. 1A–C illustrate the pieces of distribution manifold 10. FIGS. 2 through 7 illustrate other specifics.

1. Body 12

The main pieces include cylindrical body 12 (e.g. aircraft grade Aluminum 6061, approx. 12 inches long, 6 inches O.D.) having an inlet 18 connectable by well-known components to an anhydrous ammonia source. In this embodiment, the length of manifold body 12 is approximately one foot long, and its diameter is generally in the proportion indicated in FIGS. 1A–C and 2A–G.

Figure 2A:
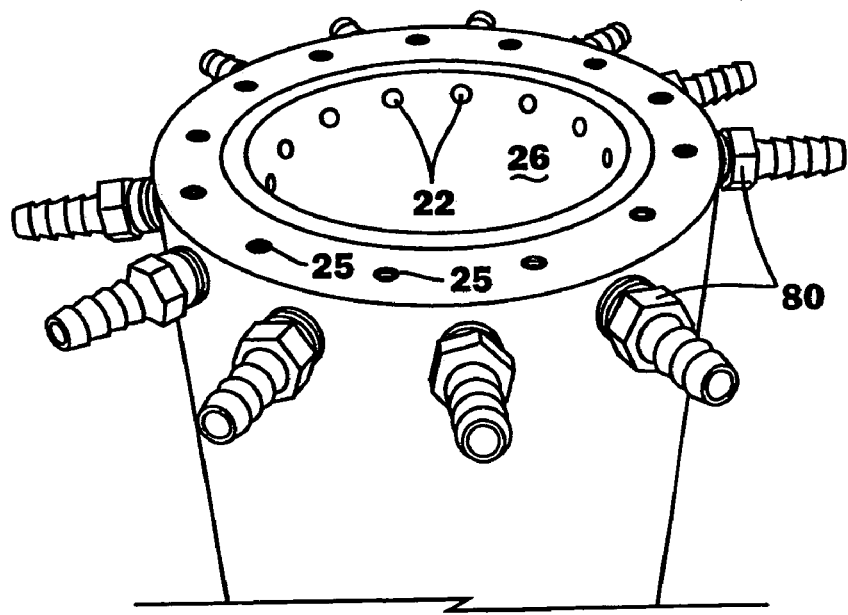
Figure 2B:
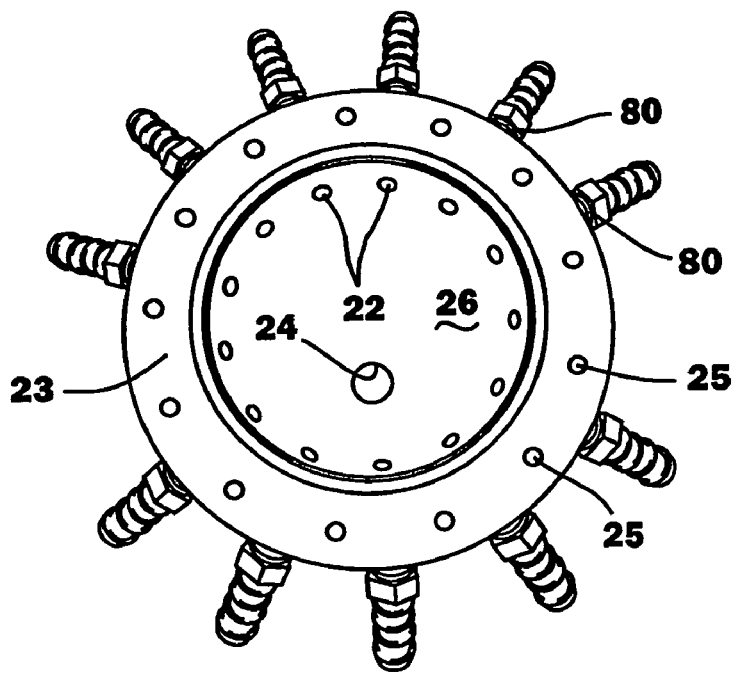
Figure 2C:
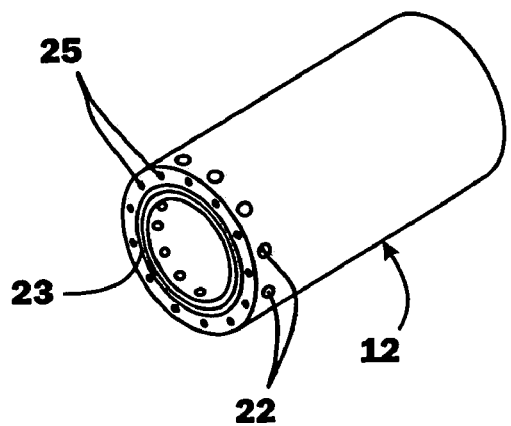
Figure 2D:
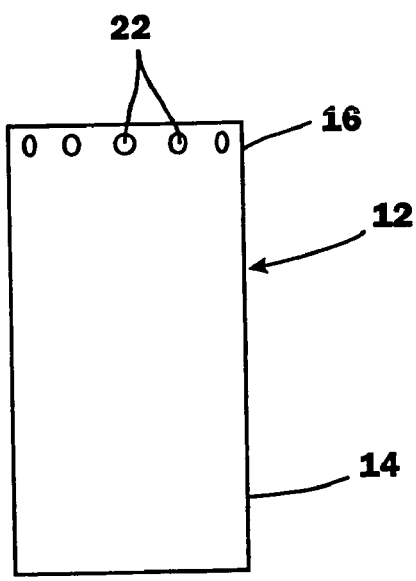
Figure 2E:
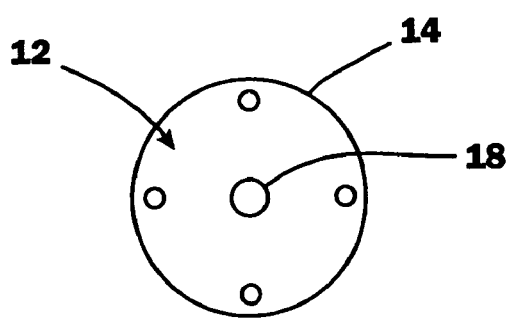
Figure 2F:
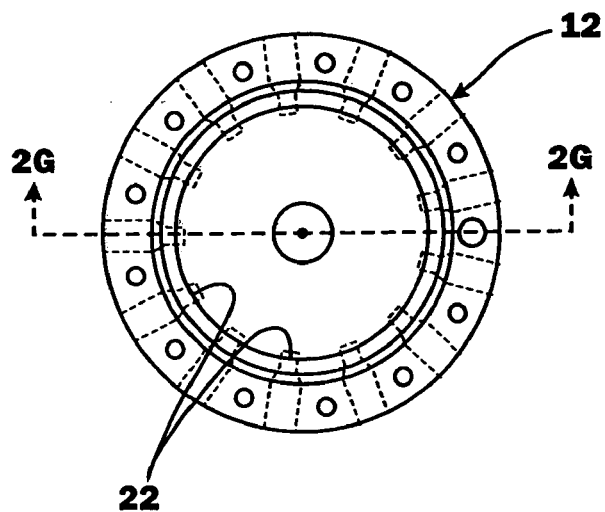
Figure 2G:
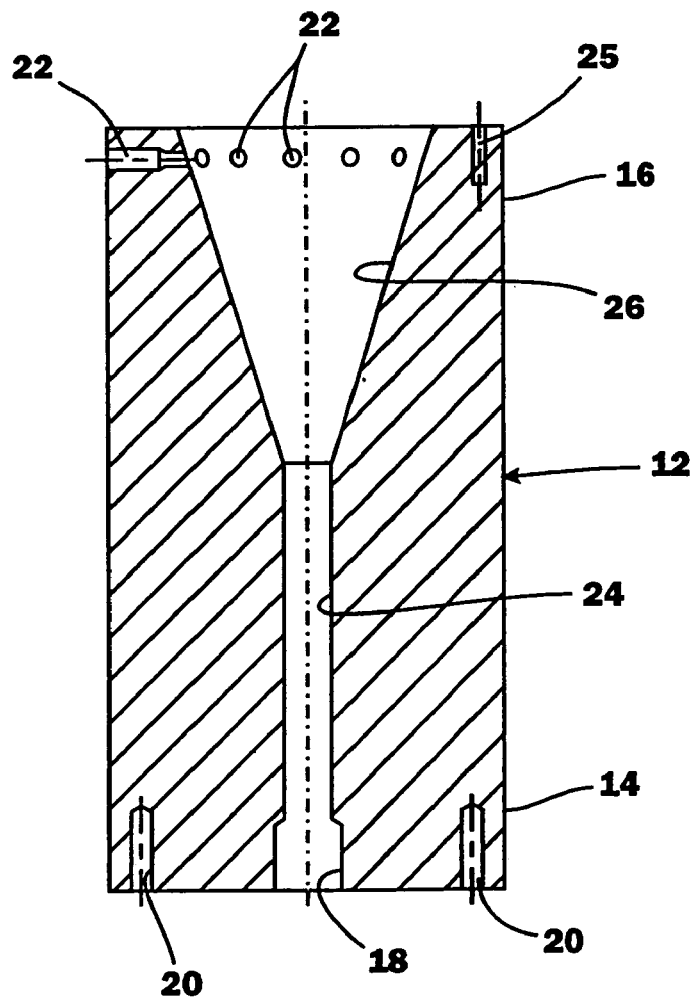

Manifold body 12 includes a central bore 24 connecting inlet 18 to a conical cavity 26 (see FIG. 1C and FIG. 2G). Radially disposed outlets 22 exist at end 16 of manifold body 12 (see also FIGS. 2A–G). Outlets 22 extend from the inside of the conical cavity 26 to the outer exterior of manifold body 12. As shown in FIGS. 1A, 2A–B, and 7, fittings 80 (well known in the art) can be operatively connected to outlets 22, and in turn each can be operatively connected to a hose or conduit to an injection knife (also well known in the art).

2. Impeller 30

An impeller 30 is insertable into conical cavity 26 of manifold body 12. In this example it is made of solid glass-impregnated Teflon®(25% impregnated with glass beads). Such material is relatively easy to machine and has relatively low change in volume over a substantial temperature range. It is approximately 4 inches diameter at its base 38. It serves as an impeller that is relatively freely rotatable once installed in position in response to pressure of fluid (liquid or gas phase) through conduit 24. Spiral grooves or flighting 34 on the exterior of impeller 30 (a conical member which closely matingly conforms to cavity 26—the slope of the exterior of impeller 30 and the slope of conical cavity 26 are the same), provides a fluid pathway from bore 24 to a distribution groove 36 in impeller 30. In this embodiment there are three spiral grooves (each approximately 1.25 rotations and 120° apart on the exterior of the impeller) (See, e.g., FIG. 3D). Thus the $NH_3$ has three spiral groove paths to enter and traverse between the tip 32 of impeller 30 and its base (at distribution groove 36). Distribution groove 36 is positioned in the plane of radial outlets 22 of manifold body 12 and is in concurrent fluid communication with all outlets 22.

The distribution groove 36 sits at exactly the elevation of outlets 22 when the system is in operation and pressure of incoming fluid has pushed impeller 30 up to the top of body 12 (There is a small amount of longitudinal tolerance between impeller 30 and body 12). Distribution groove 36 is fed by the exit ends of the three spiral grooves as they move material up from inlet 18. The fluid pathway between inlet 18 and outlets 22 here is therefore split into three separate sub-pathways or spiral grooves that can be called supply grooves. The supply grooves provide three sources to the distribution groove 36, at 120°' intervals. This allows for more even filling of distribution groove 36, than a single source would and attempts to provide constant material quality (defined at a ratio of the material in the two masses; quality=1 would be all liquid, 0.0001 would be all gas), mass, and pressure to all outlets 22. Even if impeller 30 were to stop rotating, it provides three outlets to distribution ring or groove 36 and then to outlets 22.

Figure 3A:
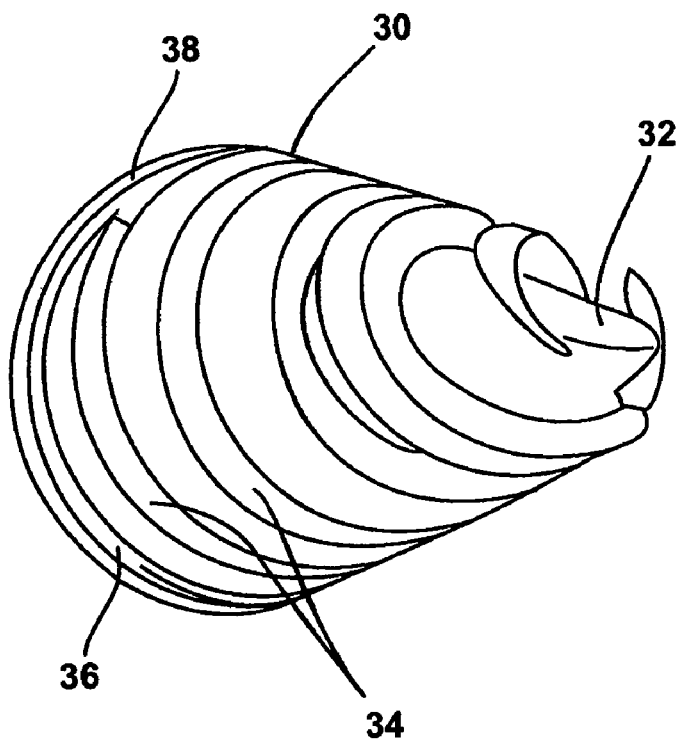
Figure 3B:
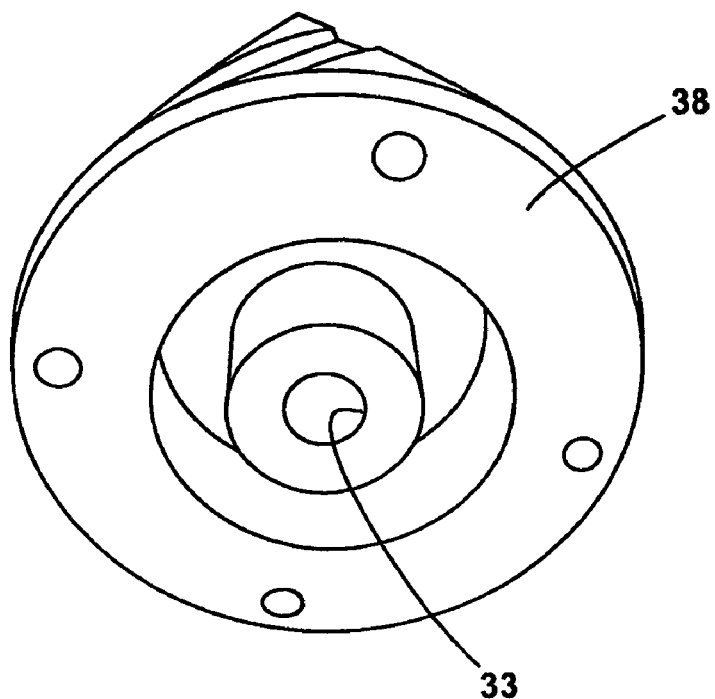
Figure 3C:
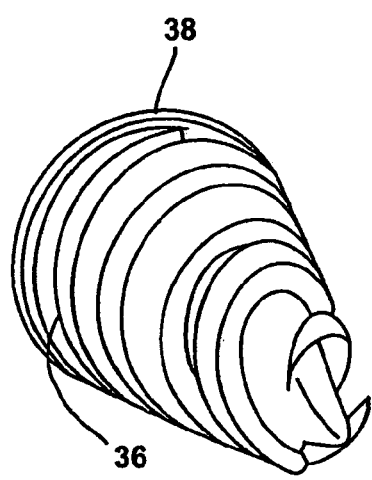
Figure 3D:
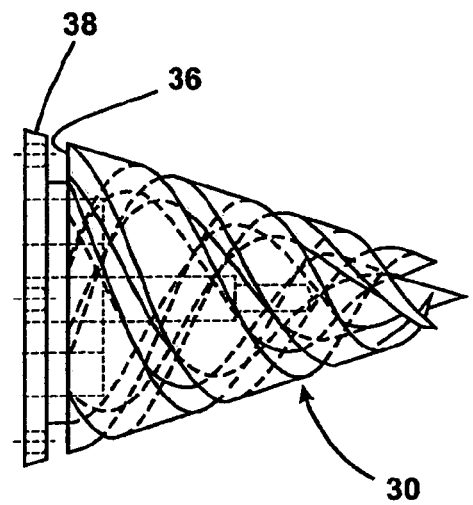
Figure 3E:
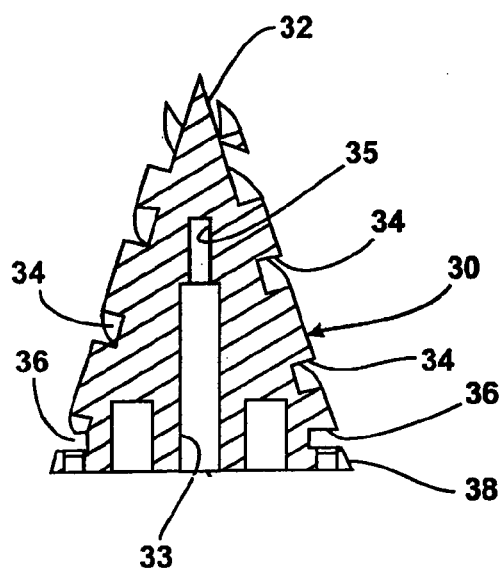
Figure 3F:
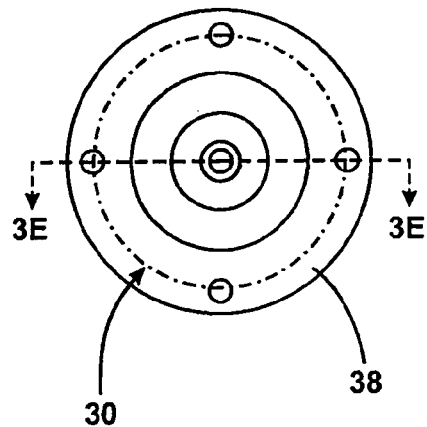

Impeller 30 is shown in more detail in FIGS. 3A–F. FIG. 3A shows, in perspective view, a rough prototype model. As shown in FIG. 1C, once assembled, impeller 30 fits in conical cavity 26. An end plate 60 (see also FIGS. 5 and 6A–C) is securable to manifold body 12 by bolts 70 through bolt holes 72 into threaded apertures 25 in the face of end 16 of manifold body 12. An elastomeric O-ring 66 (e.g. Viton® or buna-N) cooperates with a raised embossment 62 in end plate 60 and an O-ring receiving race 23 in the end base of 12 to provide a seal between body 12 and end plate 60 once assembled.

3. Bearing Assembly 40 Generally (Including Ball 50)

Impeller 30 is held in rotatable fashion as follows. A bearing apparatus (generally referred to at reference numeral 40 and shown more specifically at FIGS. 4A–H and FIG. 5), includes a threaded end 44 which extends through center opening 64 in end plate 60 and can be secured there by nut 68. An opposite end 42 includes opposite flattened portions 55, and a concave end face 53.

Figure 4A:
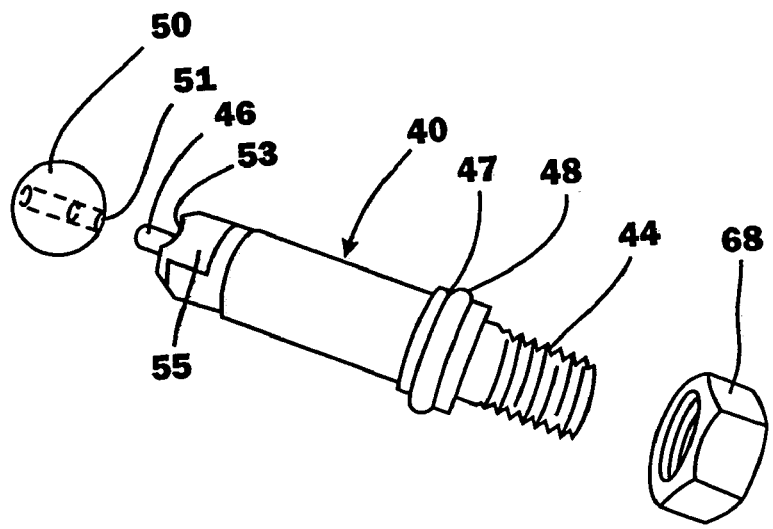

A pin 46 is interference fittable into a longitudinal receiver bore 57 at the center of concave face 53 (see FIG. 4A).

A bearing ball 50 (e.g. solid virgin Teflon®) is insertable by interference-fit onto the other end of pin 46 by forcing pin 46 into bore 51. Bore 51 is completely through ball 50, but when assembled onto pin 46, pin 46 does not extend completely through ball 50. Ball 50 is inserted on pin 46 to where it seats into concave 53. The curvature of concave 53 matches the exterior curvature of ball 50. The interference fit of pin 46 in bore 57 and ball 50 onto pin 46 holds ball 50 in place and deters rotation around pin 46. But this combination allows relatively easy removal and replacement of ball 50 (e.g. if it frictionally wears over time) by simply pulling ball 50 off of pin 46 (overcoming the interference fit).

As illustrated in FIG. 1B, a machine screw 52 is insertable into a central bore 33 (see FIG. 3E) in impeller 30 and can be threadably screwed into threaded, reduced-diameter bore 35 at the inner end of central bore 33. Screw 52 has a head that has a machined concave to match the curvature of ball 50. The concave in the head of screw 52 essentially works as a bearing surface for ball 50.

Bearing assembly 40, with ball 50 installed on pin 46 and seated in concave 53 (see FIG. 4A), can be inserted into center bore 33 of impeller 30. The diameter of ball 50 is slightly smaller than the diameter of bore 33 such that it passes into bore 33 without interference. Assembly 40 can be pushed down bore 33 until end plate 60 abuts the end 16 of body 12. As can be appreciated, the amount screw 52 is threaded into bore 35 determines how close its head will be to ball 50 when manifold 10 is assembled. Screw 52 is adjusted so that its head, specifically the concave of its head, is closely adjacent ball 50 (e.g. approximately ⅛ inch). An elastomeric O-ring 48 (e.g. Viton® or buna-N) can be installed in channel 47 of bearing assembly 40 to seal off opening 64 in end plate 60 (see also FIGS. 4A–G and FIG. 5).

Figure 5:
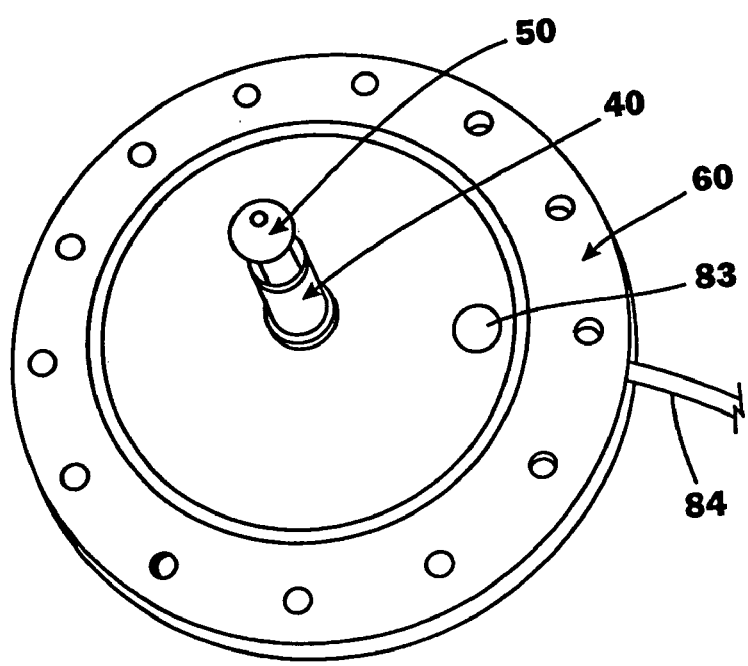
Figure 4B:
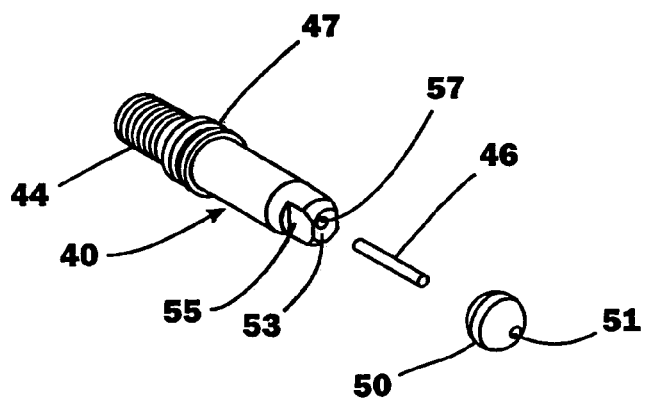
Figure 4C:
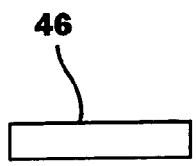
Figure 4D:
Figure 4E:
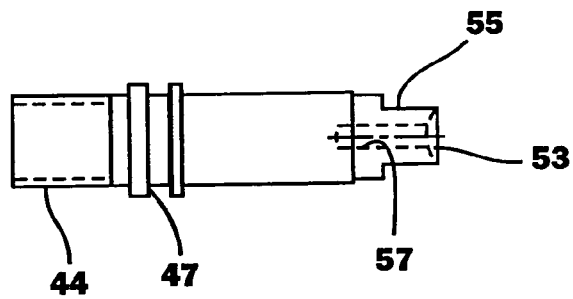
Figure 4F:
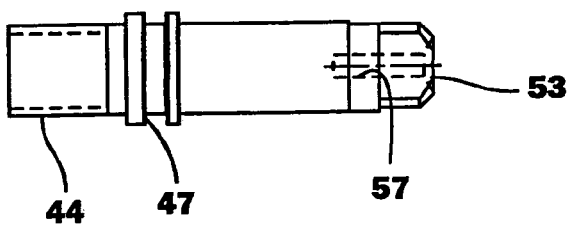
Figure 4G:
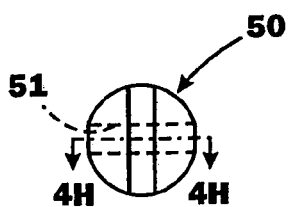
Figure 4H:
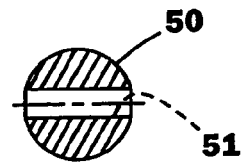
Figure 6A:
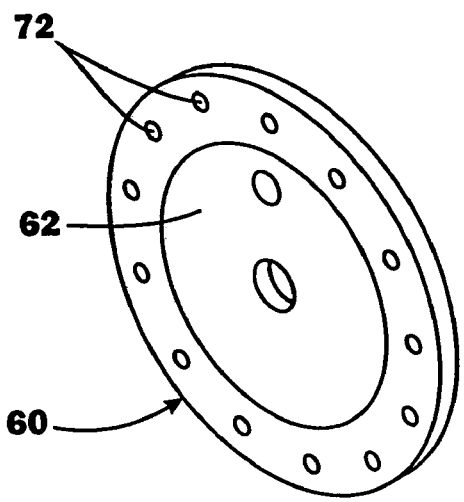
Figure 6B:
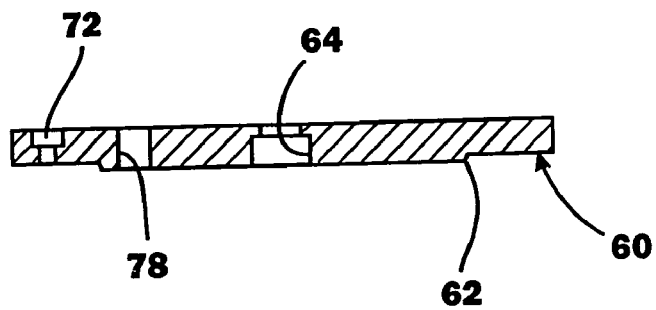
Figure 6C:
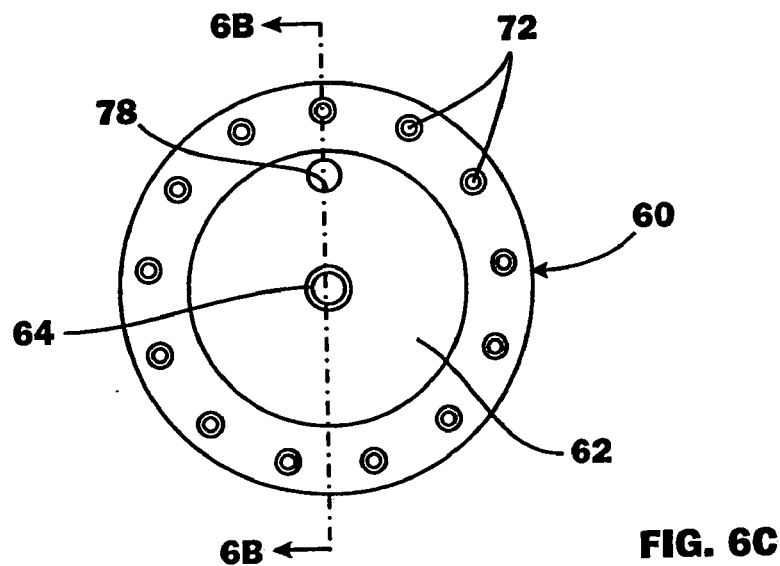

By referring to FIG. 5, once bearing assembly 40 is secured to end plate 60 and impeller 30 is in conical cavity 26, end plate 60 (with bearing assembly 40, including ball 50) is inserted, as described, such that ball 50 is positioned in bore 33 of impeller 30 and end plate 60 is secured to manifold body 12. As can be appreciated, the small tolerance between the head of screw 52 and ball 50 is designed so that when pressurized $NH_3$ enters bore 24, it travels up bore 24 and impacts the nose of impeller 30, and enters the spiral groove of impeller 30. This creates an up-force on impeller 30 (in operational position it is vertically disposed, nose down in body 12) as the pressurized fluid hits the rifling or flighting (or walls of spiral groove 34) of impeller 30 which are at an angle relative to the flow path of fluid from inlet 18.

This essentially lifts impeller from being seated in conical cavity 26 and moves impeller up longitudinally until the concave head of screw 52 in impeller 30 comes into abutment with ball 50. As indicated above, there is about ⅛ inch play. When screw 52 is in abutment with ball 50, the ball partially seats in the concave in the head of screw 52 and this is essentially the only point of contact between impeller 30 and any other structure. Thus, this interface is the rotation bearing for impeller 30. The force of the fluid acting on the walls of spiral groove 34 of impeller 30 causes impeller 30 to rotate on screw 52 around ball 50. Telfon® ball 50 presents a relatively low coefficient of friction to metal screw head 52.

Again, screw 52 can be adjusted (before assembly, or the assembly can be dissembled and screw 52 adjusted before re-assembly) along the longitudinal axis of the assembly 10 such that there is a slight longitudinal play between ball 50 and the head of screw 52.

Figure 7:
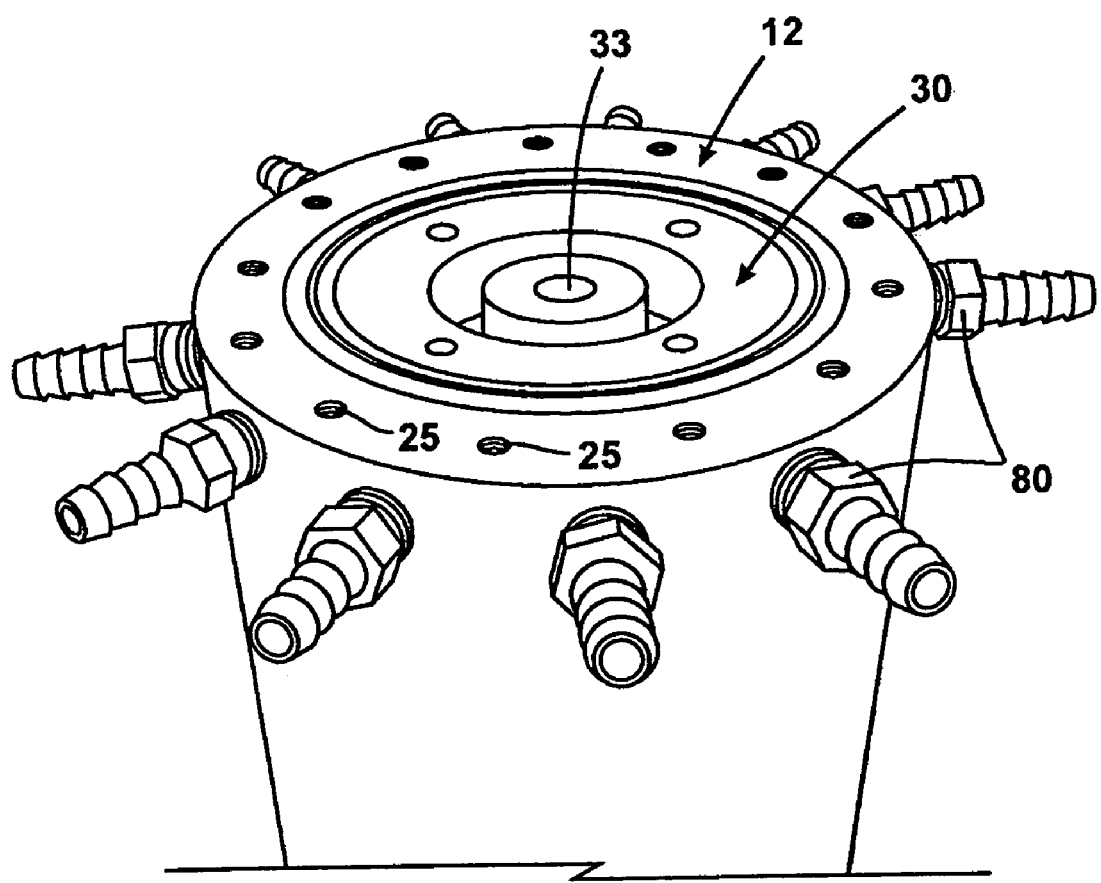
FIG. 7 illustrates in perspective view the impeller of FIGS. 3A–F installed in the body of FIGS. 2A–G, and also illustrates fittings adapted for connection to individual hoses or conduits to individual injections knives.

Referring also to FIG. 7, which shows impeller 30 in conical cavity 26, this arrangement allows relatively free-spinning of impeller 30 in manifold body 12 but seals any escape of fluid from manifold body 12 other than through outlets 22 and fittings 80.

C. Operation

In operation, distribution manifold 10 is connected to an anhydrous ammonia source through inlet 18. Threaded bores 20 on the end face of end 14 of manifold body 12 can be used to mount distribution manifold 10 to an implement. Fittings 80 are installed in each radial outlet 22 in a sealing fashion. Hoses to injection knives are connected to fittings 80. By appropriate valving or other control systems, anhydrous ammonia from its source flows into inlet 18, down conduit 24, and impacts the apex of impeller 30, entering the channel formed by flighting or spiral groove 34. The pressure (e.g. approx. 10–70 psi—pressure varies, including as a function of tank pressure and field conditions such as temperature) of the anhydrous ammonia source relative to the angle of flighting or spiral groove 34 causes impeller 30 to spin. The anhydrous ammonia follows flighting or spiral groove 34 up to distribution groove 36 in impeller 30, which is aligned with radial outlets 22, essentially distributing anhydrous ammonia to each outlet 22 in sequence at the rate of spin of the impeller 30.

A tachometer 83, connected by wire 84 to a read-out or other device, can be positioned in opening 78 on end plate 60 and used to monitor the speed of the impeller 30 (see FIG. 5).

In the exemplary embodiment, the design of impeller 30 includes a minimum of one rotation of flighting or spiral groove (here there are three end-to-end grooves each with slightly over one revolution from start to finish) and an angle of flighting or spiral groove relative to the longitudinal axis of impeller 30 that was not very steep (higher angle) or very shallow (lower angle). A basically middle of the road angle was selected with the goal to have about one-half of the force of fluid pressure pushing longitudinally or "forward" on impeller 30 and about one-half pushing sideways. This has been found to work, at the pressures normally encountered, to begin impeller 30 spinning (from its resting state) and to maintain it spinning.

Also, the sum of the cross-sectional areas of the flightings equals the cross-sectional area of the inlet of flow (the cross-sectional area of bore 24 and opening 18—both of which are approximately ¾ inch diameter). Also, the sum of the areas of each of the thirteen outlets 22 is equal to the cross-sectional area of the fluid inlet to manifold 10.

It has been found that the higher the pressure retention in the manifold, the better the distribution of the $NH_3$. Expansion areas are kept to a minimum to reduce pressure loss in the manifold body; however some variation is not necessarily materially detrimental. Pressure loss will result in temperature loss as the ammonia moves towards the boiling point at −33° C. With anhydrous ammonia, this can mean conversion of the fluid phase to gas phase (vapor). So, again, it is believed advantageous to keep the cross sectional area constant from inlet to outlets for better distribution and lower losses.

D. Options and Alternatives

It is to be understood that the present invention can take many forms and embodiments. Variations obvious to those skilled in the art will be included within the invention, which is solely described by the claims herein.

The precise size and configuration of distribution manifold 10 can be varied according to need. As indicated previously, dimensions for exemplary embodiments have been given and/or can be derived from the description and figures.

Other than the Teflon® parts, most of manifold 10 is made from aluminum. However, the materials can be varied. For example, it is preferable that as low a coefficient of friction as possible be created for bearing assembly 40. Materials other than Teflon® could be used.

For further example, it is believed that manifold 10 can be scaled up or down and be effective.

Figure 8:
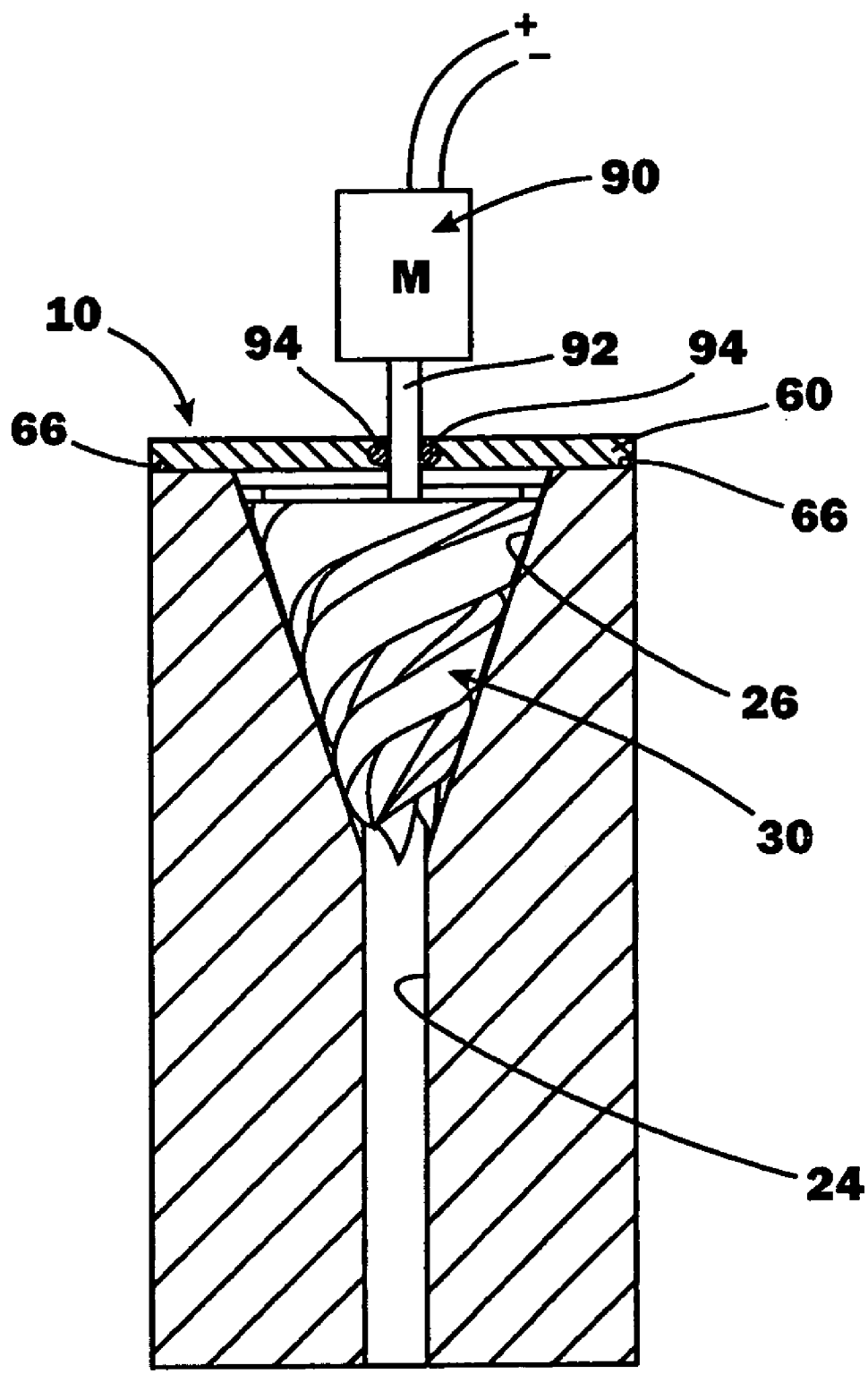
FIG. 8 is a partial sectional elevation of an alternative embodiment of the invention.

Also, it is possible to cause powered rotation of impeller 30 by mechanical means (e.g. mechanical drive, electric or gas-powered engine, magnetic drive, etc.). FIG. 8 diagrams a manifold 10 like previously described but with an electric motor 90 (e.g. variable speed) operatively connected by motor drive shaft 92 to impellor 30. A seal 94 sends shaft 92. However, it is presently preferred to have impeller rotation powered by pressure of the anhydrous ammonia itself. If powered otherwise, it could require a seal of a moving component (e.g. an axle) which is difficult to do. It also is a safety issue with anhydrous ammonia.

The impeller could have other groove configurations (e.g., one or more spiral groove(s) and at different pitches or widths).

More or less outlets 22 are possible, and outlets can be plugged if not used.

E. Design Parameters

As can be appreciated, the invention can take different embodiments and designs. Different desires and needs can result in different design criteria and goals. To assist in an understanding of design choices, and by way of example and not limitation, the following description is provided with respect to an embodiment having the following design goals for the manifold:

1. The design must be able to be machined from commonly available material stock.
2. The manifold must be able to simply replace an existing manifold, without the addition of new plumbing or controller systems.
3. The manifold should require no input from the operator, i.e. the operator should not have to "set" the manifold.
4. A single design unit should handle all application rates up to 224 kg N/ha (200 lb N/ac, 4000 lb $NH_3$/h on the test applicator), as this is a common high application rate in Midwest corn.

This design incorporated an impeller with rifled grooves that would rotate, either driven externally or allowed to spin from the impact created by the flow of the $NH_3$. Allowing the material to spin the impeller reduced sealing problems, eliminated the need for an electrical supply for the manifold, and reduced costs. The spinning created by the $NH_3$ flow was hoped to be sufficient to evenly distribute the material to outlets arranged radially around the base of a cone shaped impeller. With an impeller driven by material flow as the basic design selected, additional design parameters were evaluated.

Research showed consistently that existing manifolds with a cavity in the manifold where the $NH_3$ could expand had poor distribution. This expansion area allows an initial pressure, causing vapor production through boiling of the $NH_3$. The present manifold was designed so the cross sectional area for $NH_3$ flow would remain constant from the point at which material entered through a standard Acme fitting to the point where it left the manifold at the outlets.

For distribution systems using tank pressure to provide $NH_3$ flow, pressure drop through fittings and the regulator had been shown to be significant. This results in a mix of $NH_3$ in the liquid and vapor phases at the manifold. To reduce the possible effect of uneven distribution due to two-phase flow of the material, it was decided that the material should enter the manifold from the bottom and exit at the top. Gravity would help the chamber to fill with liquid from the bottom up. Vapor bubbles would migrate to the top of the manifold before moving out the outlets.

A test applicator used was outfitted for 11 outlets. In addition, the instrumentation to collect the temperature and pressure data for the manifold required an additional two ports. Thus, thirteen ports were used for the manifold design. Hose barbs that were 9.5-mm (0.38-in) outside diameter and 7.1-mm (0.28-in) inside diameter, common on $NH_3$ manifolds, were used to standardize the manifold to mate with existing hoses.

A 19.1-mm (0.75-in) Acme $NH_3$ fitting was selected as the inlet fitting. The 19.1-mm fitting was selected as it would allow for the flow rate necessary for the application rate goal without the excess area of the common 25.4-mm (1.0-in) Acme fitting. The cross sectional area of the inlet on the 19.1-mm fitting was 285-$mm^2$ (0.430-$in^2$). Throughout the design, the total cross-sectional area through which the material flowed was limited to this value if possible.

The sum of the groove area in the impeller, and the sum of the area of the 13 outlets were set within an acceptable range of 270 to 300-$mm^2$ (0.421 to 0.438-$in^2$). This range allowed for any limitations in machining capability. Outlet ports drilled with a 5.16-mm ($13/64^{th}$-in) drill resulted in a total outlet area for 13 ports of 272-$mm^2$ (0.422-$in^2$).

Based on readily available material and the funds for manifold development, aluminum was selected for the manifold body, and Teflon® was selected for the impeller cone.

Solid round stock of 6061-T6 aluminum 30.5-cm (12.0-in) in length and 15.3-cm (6.0-in) in diameter was selected as the blank for the manifold housing. This material was selected because of low cost, ease of machinability, low weight, and high heat conductance. Common concerns about aluminum being eroded by reacting with additives to $NH_3$ (primarily nitropyrin) were considered, but for the extent that any prototype would be used, aluminum was considered a suitable material.

For the impeller cone, Teflon® impregnated with 25% glass beads was selected and round stock 30.5-cm (12.0-in) in length and 10.2-cm (4.0-in) in diameter was used to produce two impeller cone blanks. The addition of 25% glass beads impregnated into virgin Teflon® hardens the material making it easier to accurately machine, and reduces the dimensional change of the material with temperature fluctuations.

The lid for the manifold housing was cut from one end of the round stock and finished to 1.105-cm (0.435-in) thickness. The lid was attached with 13 allen head screws and a Viton O-ring, 11.4-cm (4.5-in) in diameter, and was set in a machined groove in the housing to provide a seal. A 1.3-cm (0.5-in) diameter axle was installed into the lid for the impeller to spin on. The axle also used a Viton® O-ring to seal into the lid. A 1.3-cm (0.5-in) virgin Teflon® ball was machined to a diameter of 1.23-cm (0.485-in) and pinned to the end of the axle to provide a low friction bearing surface for the impeller cone to run on. At the bottom of the axle recess in the impeller cone, an allen head screw was machined with a concave cupped head to match the radius of the ball on the axle. This increased contact surface area and reduced wear. In addition, the threads of the screw allowed adjustment of the clearance between the lid and the base of the cone.

The length of the impeller cone cavity in the manifold housing was set at 12.7-cm (5.0-in) due to machining limitations. To allow sufficient area for the O-ring seal with the lid and the 13 lid sealing screws, the width of the cavity was limited to 9.91-cm (3.90-in). With an inlet diameter of 1.88-cm (0.74-in), the slope of the manifold housing cavity face was calculated as 17.5 degrees.

Three impeller cone designs were fabricated for testing. The first two machined from the raw stock material, and the third a modification of the first design. Design #1 used a tapering cone with a 20.5 degree taper with a single 3.2-mm (0.125-in) square groove completing 3.25 revolutions before reaching the base of the cone. The taper between the housing and the cone retains a constant cross-sectional area as the material moves up the cone. Design #2 used the same taper as the housing, 17.5 degrees, with three 9.53-mm (0.375-in) square grooves that make 1.25 revolutions each. In addition, #2 had a 6.4-mm (0.25-in) square groove cut into the impeller at the elevation of the outlets. Design #3 was the same as Design #1 with the original groove cut out to 9.53-mm (0.375-in) square. The increased groove of #3 was tried after initial tests show that impeller #1 was not turning while $NH_3$ was flowing through the manifold.

The base width of each cone was cut to 9.779-cm (3.850-in), resulting in a clearance of 0.191-cm (0.075-in) between the cone and housing and this clearance allowed the cone to move vertically on the axle. The cone was not fixed to the axle, rather it was allowed to float up due to the force of the incoming $NH_3$. When the incoming material stream forced the cone to raise off the housing, the $NH_3$ moving through the rifled grooves should cause the impeller to spin. The $NH_3$ would move up through the grooves and be distributed to the outlets near the base of the impeller.

To determine if the impeller was spinning and if so, how fast, a magnetic pulse tachometer was installed in the lid of the manifold housing. An A103-003 Tachometer (Dynapar brand, Danaher Controls, Gurnee, Ill.) was coupled to a 103SR13A Hall Effect Position Sensor (Honeywell, Freeport, Ill.). The sealed sensor, designed for harsh conditions, was installed in the lid of the manifold and four bi-polar magnets were installed into the top of each of the impeller cones. The tachometer logged pulses per second, and with 4 magnets on the cone, resolution was 15 revolutions per minute (rpm), and sensor output capability allowed outputs of up to 450 rpm.

Plans were drawn for manufacturing and modified as necessary due to machining limitations. Four threaded holes on the bottom of the housing were used for mounting the manifold to the applicator.

The bearing end of the axle was cut with a concave radius to match the bearing ball. In addition, the ball was attached only with the friction fit between the pin and the ball. This allowed for replacement of the bearing ball.

A recessed lip was machined into the edge where the tapered cavity in the housing met the top face of the housing. To match this lip and create a tight self-aligning fit, 0.178-cm (0.070-in) thickness was removed from the face of the lid to match the housing. The hole for the hall effect sensor was drilled through the lid and threads to match the sensor were tapped into the lid. The threads of the hall effect sensor were sealed with Loctite™ thread sealer to prevent $NH_3$ leakage.

Four holes in the top face of the impeller were created as locations for the hall effect sensor magnets. A machined channel around the outside of the axle recess in the cone was added to reduce the weight of the impeller cone after the initial testing phase.

A clearance problem between the cone and the manifold housing seemed to prevent the impeller cone from spinning freely in Design #2. The removal of approximately 0.127-cm (0.050-in) of material from the diameter of the impeller at and around the area of contact resolved the problem. A set of field tests was run to verify that the impeller was spinning during application and was performing as designed.

Of the three Designs described, Design #2 was selected as the best design option.

Other design considerations are discussed earlier in this description. A further design consideration, for one embodiment, is that width of fluid pathway between inlet and plurality of outlets be on the order of two to one.

In another aspect, the design prefers to give each of the plurality of outlets equal opportunity to have $NH_3$ come out all the time. One way to do so is to spin the impeller so that $NH_3$ enters the entries to the impeller spiral groove(s), moves through the spiral groove(s), and exits the exit(s) of the spiral groove(s) into the distribution groove, which is essentially a void or space that is simultaneously or concurrently in fluid communication with all the plurality of outlets from the body. Thus, the rotating exit(s) of the spiral groove(s) of the rotating impeller is directing $NH_3$ to the distribution groove—and thus presenting a substantially equal opportunity for $NH_3$ to each outlet concurrently. The goal is to present the same amount of substance, at the same pressure, concurrently to all the plurality of outlets from the body. Here this is done by spinning the material in a type of buffering action in the spiral groove(s) of the spinning impeller and then directing the material from the spinning impeller to the annular distribution groove.

What is claimed is:

1. A distribution manifold for distributing gas and/or liquid phase substance from an inlet to multiple outlets with reduced variations in distribution comprising:
  a. a body;
  b. an inlet to the body;
  c. a plurality of outlets from the body;
  d. a member comprising an external rotatable fluid pathway including an entry end in fluid communication with the inlet of the body and an exit end in fluid communication with the plurality of outlets of the body, the member comprising a rotatable impeller which includes an intermediate portion which includes the fluid pathway, which is defined at least in part by surfaces of the impeller, the surfaces on the intermediate portion comprising a wall of an external supply groove, wherein the cross-sectional area of the supply groove is generally equal to the cross sectional area of the inlet of the body;
  e. a distribution void in fluid communication between the exit end of the fluid pathway and the plurality of outlets;
  f. so that the substance passes through and out the exit end of the fluid pathway and is distributed to the plurality of outlets through the distribution void.

2. The manifold of claim 1 wherein the substance comprises a fertilizer.

3. The manifold of claim 2 wherein the fertilizer comprises anhydrous ammonia.

4. The manifold of claim 1 wherein the distribution void comprises an annular distribution groove between the exit of the supply groove and the plurality of outlets.

5. The manifold of claim 4 comprising a generally constant cross sectional area along the supply groove, distribution groove, inlet, and the sum of outlets.

6. The manifold of claim 1 wherein the impeller comprises a generally conical member having a tip end and a base end.

7. The manifold of claim 6 wherein the body includes a void between the inlet and plurality of outlets, the void having a conical portion generally matching the shape of the impeller.

8. The manifold of claim 7 wherein the body further comprises a cover removable over the void.

9. The manifold of claim 8 further comprising a sealing member between the cover and body.

10. The manifold of claim 8 wherein there is some longitudinal tolerance between the impeller and the body when the impeller is operatively positioned in the body.

11. The manifold of claim 1 wherein the cross sectional area of the inlet of the body is generally equal to the sum of cross-sectional areas of the plurality of outlets of the body.

12. The manifold of claim 1 wherein the angle of the wall of the supply groove is generally selected to produce one-half of the pressure of the substance to push longitudinally or forward and one-half of the pressure to push sideways on the impeller.

13. The manifold of claim 1 wherein the fluid pathway comprises a spiral groove approximately three rotations on the impeller.

14. The manifold of claim 1 wherein the fluid pathway comprises a plurality of spiral grooves each having entrances in fluid communication with the inlet to the body and exits in fluid communication with the distribution void.

15. The manifold of claim 1 further comprising a bearing associated with the member to facilitate rotation of the member in the body in response to fluid pressure on the member.

16. The manifold of claim 15 wherein the bearing comprises an axle having a bearing surface at a distal end extended inwardly of the body.

17. The manifold of claim 1 wherein the plurality of outlets are radially disposed and spaced apart around the body.

18. The manifold of claim 17 further comprising a connector mounted in fluid communication with each of the plurality of outlets in the body, the connectors adapted for connection to fluid conduits.

19. The manifold of claim 18 wherein the connectors are adapted for connection to fluid conduits terminating in injection knives.

20. The manifold of claim 1 wherein the inlet of the body includes a connector adapted for connection to a source of the substance.

21. The manifold of claim 20 wherein the connector is in fluid communication with a tank of substance.

22. The manifold of claim 1 further comprising an actuator operatively connected to the member to rotate the member in the body.

23. The manifold of claim 22 wherein the actuator is a motor.

24. The manifold of claim 1 further comprising a sensor operatively positioned to derive speed of rotation of the member.

25. The manifold of claim 1 in combination with an implement to carry a plurality of injection knives.

26. The manifold of claim 25 further in combination with an automotive vehicle.

27. The manifold of claim 26 further in combination with a tank of anhydrous ammonia.

28. An apparatus for distributing a gas and/or liquid phase substance from an inlet to multiple outlets comprising:
   a housing comprising an inlet, a plurality of outlets, a chamber between the inlet and the plurality of outlets;
   a rotatable member positioned in the chamber, the rotatable member defining an external substance path in fluid communication with the inlet and a space in fluid communication with the plurality of outlets;
   a generally constant cross sectional area along the substance path, the space, the inlet, and the sum of the outlets;
   so that rotation of the rotatable member rotates the substance path and distributes substance from the inlet to the space in fluid communication with the outlets.

29. The apparatus of claim 28 wherein the rotatable member is a conical piece including at least one spiral groove from an entry at or near its tip to an exit at or near the base, and a bearing to facilitate rotation of the conical piece in the housing.

30. The apparatus of claim 28 comprising multiple substance paths.

31. The apparatus of claim 30 wherein the multiple substance paths each have an outlet in fluid communication with said space which is in fluid communication with the plurality of outlets in the housing.

32. The apparatus of claim 30 wherein the multiple substance paths comprise three spiral grooves.

33. The apparatus of claim 32 wherein the three spiral grooves each have an outlet which terminates in fluid communication with the space which is in fluid communication with the plurality of outlets in the housing, each spiral groove outlet spaced approximately 120 degrees from the next.

34. A distribution manifold for distributing gas and/or liquid phase substance from an inlet to multiple outlets with reduced variations in distribution comprising:
   a. a body;
   b. an inlet to the body;
   c. a plurality of outlets from the body;
   d. a member comprising a rotatable fluid pathway including an entry end in fluid communication with the inlet of the body and an exit end in fluid communication with the plurality of outlets of the body, wherein the member comprises a rotatable impeller which includes an intermediate portion which includes the fluid pathway, which is defined at least in part by surfaces of the impeller, and the surfaces on the intermediate portion comprise a wall of an external supply groove having the entry end in fluid communication with the inlet of the body and the exit end in fluid communication with the plurality of outlets of the body,
   e. a distribution void in fluid communication between the exit end of the fluid pathway and the plurality of outlets, the distribution void comprising an annular distribution groove between the exit of the supply groove and the plurality of outlets;
   f. so that the substance passes through and out the exit end of the fluid pathway and is distributed to the plurality of outlets through the distribution void.

35. The distribution manifold of claim 34 comprising a generally constant cross sectional area along the fluid pathway, the distribution void, the inlet, and the sum of the outlets.

36. The distribution manifold of claim 34 comprising multiple fluid pathways.

37. The distribution manifold of claim 36 wherein the multiple fluid pathways each have an outlet in fluid communication with said distribution void which is in fluid communication with the plurality of outlets in the housing.

38. A distribution manifold for distributing gas and/or liquid phase substance from an inlet to multiple outlets with reduced variations in distribution comprising:
   a. a body;
   b. an inlet to the body;
   c. a plurality of outlets from the body;
   d. a member comprising a rotatable fluid pathway including an entry end in fluid communication with the inlet of the body and an exit end in fluid communication with the plurality of outlets of the body, wherein the member comprises a rotatable impeller which includes an intermediate portion which includes the fluid pathway, which is defined at least in part by surfaces of the impeller, wherein the impeller comprises a generally conical member having a tip end and a base end;
   e. a distribution void in fluid communication between the exit end of the fluid pathway and the plurality of outlets;
   f. so that the substance passes through and out the exit end of the fluid pathway and is distributed to the plurality of outlets through the distribution void.

39. The manifold of claim 38 wherein the body includes a void between the inlet and plurality of outlets, the void having a conical portion generally matching the shape of the impeller.

40. The manifold of claim 39 wherein the body further comprises a cover removable over the void.

41. The manifold of claim 40 further comprising a sealing member between the cover and body.

42. The manifold of claim 40 wherein there is some longitudinal tolerance between the impeller and the body when the impeller is operatively positioned in the body.

43. The distribution manifold of claim 38 comprising a generally constant cross sectional area along the fluid pathway, the distribution void, the inlet, and the sum of the outlets.

44. The distribution manifold of claim 38 comprising multiple fluid pathways.

45. The distribution manifold of claim 44 wherein the multiple fluid pathways each have an outlet in fluid communication with said distribution void which is in fluid communication with the plurality of outlets in the housing.

46. An apparatus for distributing a gas and/or liquid phase substance from an inlet to multiple outlets comprising:
   a housing comprising an inlet, a plurality of outlets, a chamber between the inlet and the plurality of outlets;

a rotatable member positioned in the chamber, the rotatable member defining an external substance path in fluid communication with the inlet and a space in fluid communication with the plurality of outlets;

wherein the rotatable member is a conical piece including at least one spiral groove from an entry at or near its tip to an exit at or near the base, and a bearing to facilitate rotation of the conical piece in the housing;

so that rotation of the rotatable member rotates the substance path and distributes substance from the inlet to the space in fluid communication with the outlets.

47. The apparatus of claim 46 comprising a generally constant cross sectional area along the substance path, the space, the inlet, and the sum of the outlets.

48. The apparatus of claim 46 comprising multiple substance paths.

49. The apparatus of claim 48 wherein the multiple substance paths each have an outlet in fluid communication with said space which is in fluid communication with the plurality of outlets in the housing.

50. A distribution manifold for distributing gas and/or liquid phase substance from an inlet to multiple outlets with reduced variations in distribution comprising:
 a. a body;
 b. an inlet to the body;
 c. a plurality of outlets from the body;
 d. a member comprising a rotatable fluid pathway including an entry end in fluid communication with the inlet of the body and an exit end in fluid communication with the plurality of outlets of the body, wherein the member comprises a rotatable impeller which includes an intermediate portion which includes the fluid pathway, which is defined at least in part by surfaces of the impeller and wherein the fluid pathway comprises a spiral groove approximately three rotations on the impeller;
 e. a distribution void in fluid communication between the exit end of the fluid pathway and the plurality of outlets;
 f. so that the substance passes through and out the exit end of the fluid pathway and is distributed to the plurality of outlets through the distribution void.

51. The distribution manifold of claim 50 comprising a generally constant cross sectional area along the fluid pathway, the distribution void, the inlet, and the sum of the outlets.

52. The distribution manifold of claim 50 comprising multiple fluid pathways.

53. The distribution manifold of claim 52 wherein the multiple fluid pathways each have an outlet in fluid communication with said distribution void which is in fluid communication with the plurality of outlets in the housing.

54. A distribution manifold for distributing gas and/or liquid phase substance from an inlet to multiple outlets with reduced variations in distribution comprising:
 a. a body,
 b. an inlet to the body;
 c. a plurality of outlets from the body;
 d. a member comprising a rotatable fluid pathway including an entry end in fluid communication with the inlet of the body and an exit end in fluid communication with the plurality of outlets of the body, wherein the member comprises a rotatable impeller which includes an intermediate portion which includes the fluid pathway, which is defined at least in part by surfaces of the impeller; the surfaces on the intermediate portion comprise a wall of an external supply groove having the entry end in fluid communication with the inlet of the body and the exit end in fluid communication with the plurality of outlets of the body; and the cross-sectional area of the inlet of the body is generally equal to the sum of the cross-sectional areas of the plurality of outlets of the body;
 e. a distribution void in fluid communication between the exit end of the fluid pathway and the plurality of outlets;
 f. so that the substance passes through and out the exit end of the fluid pathway and is distributed to the plurality of outlets through the distribution void.

55. The distribution manifold of claim 54 comprising a generally constant cross sectional area along the fluid pathway, the distribution void, the inlet, and the sum of the outlets.

56. The distribution manifold of claim 54 comprising multiple fluid pathways.

57. The distribution manifold of claim 56 wherein the multiple fluid pathways each have an outlet in fluid communication with said distribution void which is in fluid communication with the plurality of outlets in the housing.

58. A distribution manifold for distributing gas and/or liquid phase substance from an inlet to multiple outlets with reduced variations in distribution comprising:
 a. a body;
 b. an inlet to the body;
 c. a plurality of outlets from the body;
 d. a member comprising a rotatable fluid pathway including an entry end in fluid communication with the inlet of the body and an exit end in fluid communication with the plurality of outlets of the body, wherein the member comprises a rotatable impeller which includes an intermediate portion which includes the fluid pathway, which is defined at least in part by surfaces of the impeller; and the surfaces on the intermediate portion comprise a wall of an external supply groove having the entry end in fluid communication with the inlet of the body and the exit end in fluid communication with the plurality of outlets of the body;
 e. a distribution void in fluid communication between the exit end of the fluid pathway and the plurality of outlets, wherein the distribution void comprises an annular distribution groove between the exit of the supply groove and the plurality of outlets;
 f. wherein there is a generally constant cross-sectional area along the supply groove, the distribution groove, the inlet, and the sum of the outlets;
 g. so that the substance passes through and out the exit end of the fluid pathway and is distributed to the plurality of outlets through the distribution void.

59. The distribution manifold of claim 58 comprising multiple fluid pathways.

60. The distribution manifold of claim 59 wherein the multiple fluid pathways each have an outlet in fluid communication with said distribution void which is in fluid communication with the plurality of outlets in the housing.

* * * * *